May 31, 1927. Re. 16,641

G. M. HARSH

PYJAMA TROUSERS

Original Filed Feb. 19, 1926 2 Sheets-Sheet 1

Witnesses

Inventor

George M. Harsh

Attorney

May 31, 1927. Re. 16,641
G. M. HARSH
PYJAMA TROUSERS
Original Filed Feb. 19, 1926 2 Sheets-Sheet 2
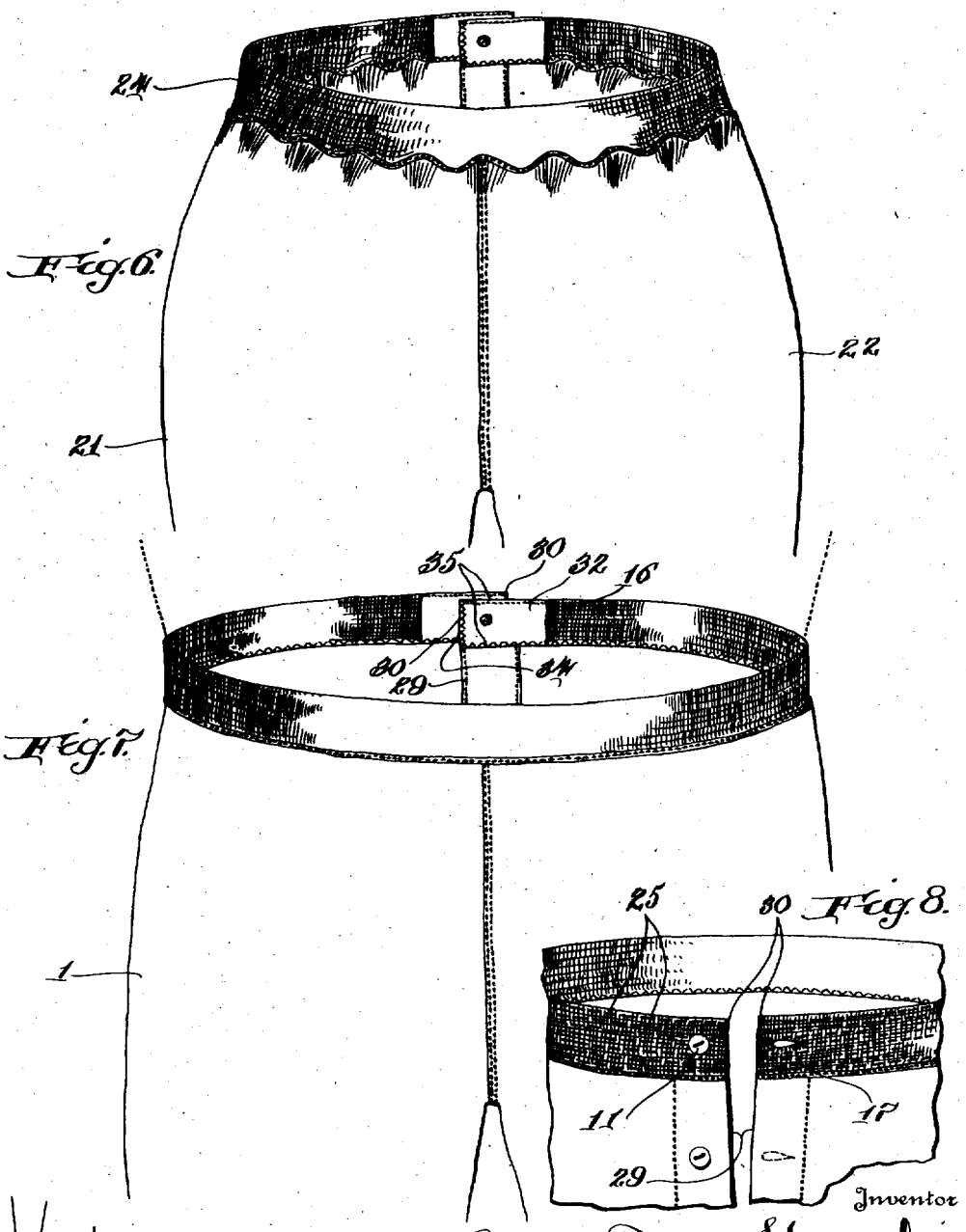
Witnesses
Porter H. Flautt.
Inventor
George M. Harsh
By Edwin F. Hammond
Attorney Reissued May 31, 1927. Re. 16,641

UNITED STATES PATENT OFFICE.

GEORGE M. HARSH, OF BALTIMORE, MARYLAND.

PYJAMA TROUSERS.

Original No. 1,593,631, dated July 27, 1926, Serial No. 89,405, filed February 19, 1926. Application for reissue filed January 8, 1927. Serial No. 159,969.

The draw string or other fastening means at the waist is a well known source of annoyance and discomfort in connection with the common type of pyjama trousers. When the string is drawn tight enough to support the garment it is ordinarily too tight for comfort and it is frequently knotted and broken. Under these circumstances it can only be replaced with difficulty. Pyjama trousers buttoned at the waist and without a draw string are not much used because when fitted tightly enough to stay up when the wearer is upright, they are too tight in the reclining position and for wear throughout the night. The expedient whereby an elastic band is passed through the hem of the garment, the ends being connected together, the band not being fastened to the fabric at any point, is well known, but this is unsatisfactory, and all garments of the draw string type are comparatively unsightly.

The present invention relates to a new elastic fabric of stretchable textile material and rubber, the same being particularly adapted for use as a garment supporting band, but capable of more general use. This fabric has been developed in connection with an improved garment in the nature of pyjama trousers or trousers for a pyjama suit whereby the difficulties recited are overcome. The garment is provided with a waist band of elastic mesh fabric which contains sheet rubber and the hips and waist of the garment may be made slightly, but not excessively full, it being understood that the main body of the garment is made of an inelastic woven fabric. The upper edge of the garment fabric is gathered slightly, but not pleated, and secured to the lower edge of the waist band. This produces, when the waist band is free and, therefore, contracted, the effect of fluting or waving at the top of the inelastic fabric instead of the effect of creases or pleats, as described in certain prior patents relating particularly to skirts. When the garment is worn the waist portion lies flat over the waist of the wearer, not binding or giving the effect of excessive tightness at the waist as in a draw string garment having either a plain or elastic string.

In the preferred form the garment is provided with a fly opening at the front and a suitable fastening at the meeting ends of the waist band at the top of the garment, so that it is not necessary to stretch the garment over the hips, which makes it possible to dispense with excessive fullness as pointed out. The object of the elastic waist band is mainly to cause the garment to fit at the waist so it is supported without discomfort.

While I have hereinafter described in detail a garment waist structure and the preferred arrangement and manner of attaching and closing the waist band at the ends, these details are not regarded as essential, the invention being of a broader scope, and comprising a waist band of elastic textile webbing covering a strip of sheet rubber secured to the webbing by elastic stitching, which latter term is used as referring to a stitching so arranged as not to interfere unduly with the elasticity of the rubber and to distribute the same uniformly, giving uniform contraction and expansion of the fabric covering the rubber sufficient to cause the waist band to cling and fit without discomfort and preventing the complete failure of the elastic element of the band due to rupturing the rubber at a single point or at a few points.

The invention provides not only a garment supporting band, but a composite elastic fabric consisting of stretchable textile fabric covering a thin sheet of rubber and sewed thereto by stitching so arranged as not to interfere, at least within the desired predetermined limits, with the elasticity of the combined fabric.

In the accompanying drawings I have illustrated a pyjama trousers garment embodying the features of the invention in the preferred form, and in what is at present regarded as a secondary form.

In the drawings:

Figure 6 is a view similar to Figure 1 showing a different form of waist band.

Figures 1, 2, 3, 4, 5:
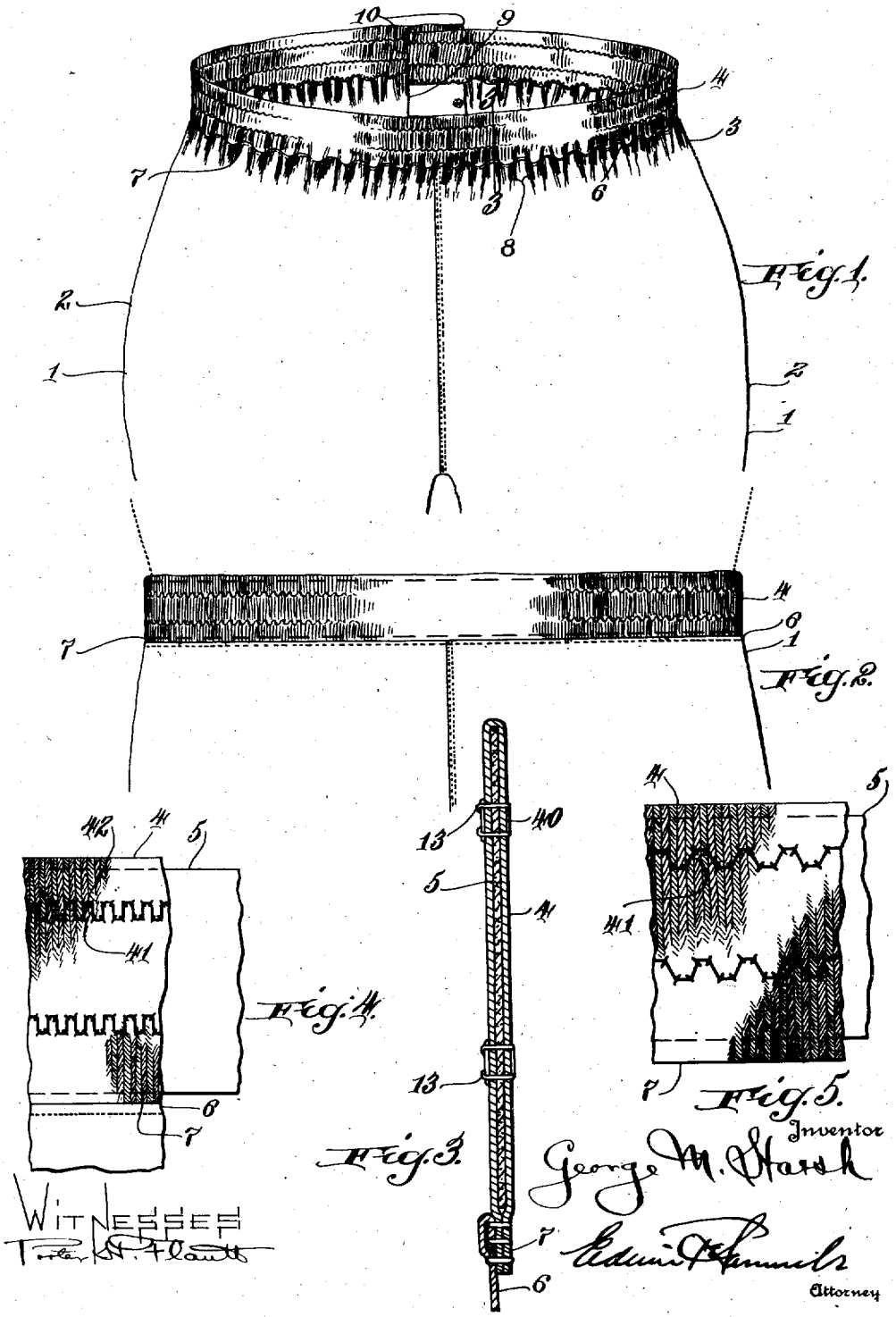
Figure 1 is an elevation of the waist and hip portion of the garment looking from the rear, the waist band being contracted.
Figure 2 is a similar view showing the garment in the position which it takes when worn, the outline of the body above the waist of the garment being indicated in dotted lines.
Figure 3 is a cross section through the band on the line 3—3 of Figure 1.
Figure 4 is an elevation of a fragment of the band on an enlarged scale, the band being contracted.
Figure 5 is an elevation of a similar portion of the band expanded.

Figure 7 corresponds to Figure 2; and

Figure 8 is a fragmentary view showing the meeting ends of the band and waist portion at the fly slightly separated as if about to be drawn together and buttoned about the wearer.

Referring to the drawings by numerals, each of which is used to indicate the same or similar parts in the different figures, and first having reference to Figures 1 to 5, the preferred form of garment, as shown, comprises a main or body portion and legs 1 of inelastic woven fabric slightly full at the hips 2 and waist portion 3. This garment is provided with a waist band 4 of elastic mesh fabric which may contain rubber or similar material 5. This band is in normal or contracted position slightly shorter than the corresponding length of the top edge 6 of the garment fabric and the top edge 6 is sewed to the bottom edge 7 of the waist band, the waist band being stretched for this purpose to the full length of the edge 6 of inelastic fabric, so that in contracted position the top portion 3 of the inelastic fabric is gathered as shown at 8, or slightly waved, but not pleated. To produce this effect the band 4 may be possessed of a comparatively slight degree of elasticity as compared to the usual elastic bands used for garters and the like.

In the form of garment shown there is an opening in the nature of a fly at 9 at the front and the waist band is formed with meeting ends 10. These ends, as shown, are fastened in any suitable manner as by a button 11. See Figure 8.

In what is considered the preferred form of the invention the waist band 4 is of elastic tubular fabric and to give increased elasticity to the band a strip or strap 5 of thin rubber or similar material, the rubber being of a composition which resists, to the last degree, chemicals, water and heat, as applied in ordinary steam laundry work, is placed inside the tube or otherwise assembled with the waist band. This strap or strip is of very thin sheet material and may be of a width almost equal to the inside of the band when flattened. To distribute the resilient effect of the strip throughout the length of the waist band and, if desired, to prevent injury to the band and fabric by stretching beyond the desired maximum elongation, and also to prevent breaking of the seam 6 and possible tearing of the top edge of the garment fabric 1 at the waist portion at 3, the waist band tube 4 and strap 5 are stitched throughout the length of the band with one or more circumferential or longitudinal lines of stitching 13. Each line of stitching is preferably formed with, or of, a heavy strand 40, which should be of a strong fiber, as silk.

This stitching may be correctly described as reinforcing the band, and to give elasticity and at the same time limit the elastic yielding of the band, the stitching may be arranged in various ways to give the desired result. In view of the information at present at hand it is preferably arranged somewhat as shown giving a zigzag seam, the stitching being in appearance very much like a succession of U's or V's oppositely disposed and joined at the ends of the legs. Preferably each leg 41 of a U is formed of a single stitch transverse to the length of the band and the base or connecting portion of each U 42, which joins one end of each leg, is also a single stitch, though the arrangement of the stitches may be varied without departure from the intent of the invention. As already stated, Figure 4 shows a fragment of the waist band contracted, and Figure 5 shows the same section expanded. Stretching of the waist band has the effect of deflecting the legs 41 so that instead of being parallel as in the contracted condition of the band they diverge at an angle which, as shown, is from thirty to forty-five degrees, though this is variable and dependent on other conditions. It will be noted that the lines of stitching are spaced with substantial uniformity across the fabric and that they have a considerable spread due to the zigzag arrangement of the stitches, so that the lines of stitching serve not only to communicate the elasticity of the rubber to the textile fabric, but to distribute the same with substantial uniformity throughout the area of the textile fabric.

In Figures 6, 7 and 8 I have illustrated another form of the invention in which a tubular fabric elastic band 24 is used without the strip 5 of rubber or similar sheet material, but the fabric of which the band is composed may contain strands 25 of rubber interwoven with the textile fabric of which the band is formed, however, the fabric band without the rubber has a considerable degree of elasticity and may be so used.

In connection with the button and buttonhole fastenings 11, 17, I have shown a reinforce which prevents pulling and distortion of the fabric around the fastenings, the reinforce as shown being in the nature of rectangular tabs 32 which are sewed to the waist band covering the end portions of the same, as shown, the edges of the tabs being sewed to the band. In the preferred form, in order to obtain the benefit of the elasticity of the full length of the band these tabs are sewed to the waist band 24 along three edges only, i. e., at the end edge 34 and the top and bottom edges 35, the other end edge 16 toward the center of the band being left unattached. The buttons 11 are sewed through and through the pad and reinforcement and the button holes 17 are similarly formed.

The waist band, as disclosed, of sheet rubber covered with stretchable textile fabric and sewed with stitching so arranged as not to prevent stretching, at least within the desired elongation, constitutes a new elastic fabric capable of use as a supporting or holding means for any kind of wearing apparel and as an elastic member or fabric for use in any wearing apparel in any way.

I have thus described specifically and in detail a single embodiment of my invention in order that the nature and operation of the same may be clearly understood. However, the specific terms herein are used descriptively rather than in a limiting sense, the scope of the invention being defined in the claims.

What I claim and desire by Letters Patent is:

1. In a pyjama trousers garment inelastic material composing the body portion of the garment and a waist band of elastic mesh fabric, which when contracted is slightly shorter than the top edge of the garment fabric, the waist band being sewed to the top edge of the garment fabric, the garment having a front opening and cooperating fastening means at each end of the waist band at each side of the opening, and tabs reinforcing the ends of the waist band on each side of the opening, stitching attaching the tabs at the top, bottom and outer end edges, the other edge of each tab being free.

2. In a pyjama trousers garment, a waist band consisting of a tubular elastic textile fabric, a band of sheet rubber enclosed within the elastic fabric, and stitching securing the rubber to the fabric throughout substantially the entire length of the rubber, the stitching comprising stitches placed transversely to the direction of the band.

3. In a garment, a waist band consisting of a tube of elastic textile fabric, a strip of sheet rubber enclosed within the tubular fabric, and elastic stitching securing the rubber to the fabric for substantially the entire length of the rubber.

4. An elastic band of fabric and rubber comprising sheet rubber, a covering of stretchable textile fabric, and elastic stitching sewed through and through the rubber and fabric connecting the rubber to the fabric and comprising stitching spaced inwardly from the edges of the rubber distributing the elasticity of the rubber with substantial uniformity throughout the area of the overlying fabric.

5. An elastic band of fabric and rubber comprising a strip of sheet rubber, a covering of stretchable textile fabric, and stitching intermediate the edges of the rubber sewed through and through the rubber and fabric connecting the rubber to the fabric and distributing the elasticity of the rubber throughout the overlying portion of the fabric, the stitching comprising stitches inclined to the length of the band so that when the band is elongated the stitching conforms to the increased length of the band by change of the direction of the inclined stitches approaching parallelism with the length of the band, the textile fabric lying flat on the rubber in the relaxed condition of the band.

6. A supporting band for wearing apparel consisting of a tube of elastic textile fabric, a strip of sheet rubber enclosed within the fabric and elastic stitching securing the rubber to the fabric causing the textile fabric to contract and expand with the rubber, the fabric lying flat on the rubber at all times.

7. A supporting band for wearing apparel consisting of a strip of sheet rubber, elastic textile fabric covering the strip on both sides and folded over an edge of the band, the fabric and rubber being connected by stitching extending through and through the fabric and rubber and including stitching spaced inwardly from the edges of the strip causing the fabric to expand and contract with the rubber, the textile fabric lying flat on the rubber in the relaxed condition of the band.

Signed by me at Baltimore, Maryland, this 31st day of December, 1926.

GEORGE M. HARSH.